(12) United States Patent
Hunter

(10) Patent No.: US 6,327,320 B1
(45) Date of Patent: Dec. 4, 2001

(54) TUBE LOADING APPARATUS

(75) Inventor: David Clifford Hunter, Preston (GB)

(73) Assignee: British Nuclear Fuels plc, Cheshire (GB)

( * ) Notice: Subject to any disclaimer, the term of this patent is extended or adjusted under 35 U.S.C. 154(b) by 0 days.

(21) Appl. No.: 09/446,345

(22) PCT Filed: Jun. 22, 1998

(86) PCT No.: PCT/GB98/01024

§ 371 Date: Dec. 16, 1999

§ 102(e) Date: Dec. 16, 1999

(87) PCT Pub. No.: WO99/00800

PCT Pub. Date: Jan. 7, 1999

(30) Foreign Application Priority Data

Jun. 25, 1997 (GB) .................................................. 9713268

(51) Int. Cl.⁷ .................................................. G21C 21/02
(52) U.S. Cl. ........................ 376/260; 376/261; 376/409; 414/146
(58) Field of Search .................. 376/260, 261, 376/409; 414/146

(56) References Cited

U.S. PATENT DOCUMENTS

| 3,746,190 | 7/1973 | Hotz ........................................ 214/34 |
| 4,548,347 | * 10/1985 | Christiansen et al. .................. 228/48 |
| 5,019,326 | * 5/1991 | Yaginuma et al. .................... 376/261 |
| 5,323,433 | * 6/1994 | Yaginuma et al. .................... 376/261 |

FOREIGN PATENT DOCUMENTS

| 62108194 A | 5/1987 | (JP) | ............................ G21C/21/02 |
| 01101498 | 4/1989 | (JP) | ............................ G21C/21/02 |
| 02163697 | 6/1990 | (JP) | ............................ G21C/21/02 |
| 03175400 | 7/1991 | (JP) | ............................ G21C/21/02 |
| 05281397 | 10/1993 | (JP) | ............................ G21C/21/02 |
| 06-138288 | * 5/1994 | (JP) | ...................................... 376/261 |
| 2156508 | * 9/2000 | (RU) | ...................................... 376/261 |

* cited by examiner

Primary Examiner—Michael J. Carone
Assistant Examiner—Jack Keith
(74) Attorney, Agent, or Firm—Myers Bigel Sibley & Sajovec, P.A.

(57) ABSTRACT

An apparatus for succesively loading solid objects (19) into a tube (27), for instance, nuclear fuel pellets into a nuclear fuel tube, includes means (17) for feeding the objects towards one, open end (29) of the tube. A reduced pressure is induced between each solid object and the tube end prior to entry of the object into the tube.

23 Claims, 1 Drawing Sheet

TUBE LOADING APPARATUS

FIELD OF THE INVENTION

Figure 1:
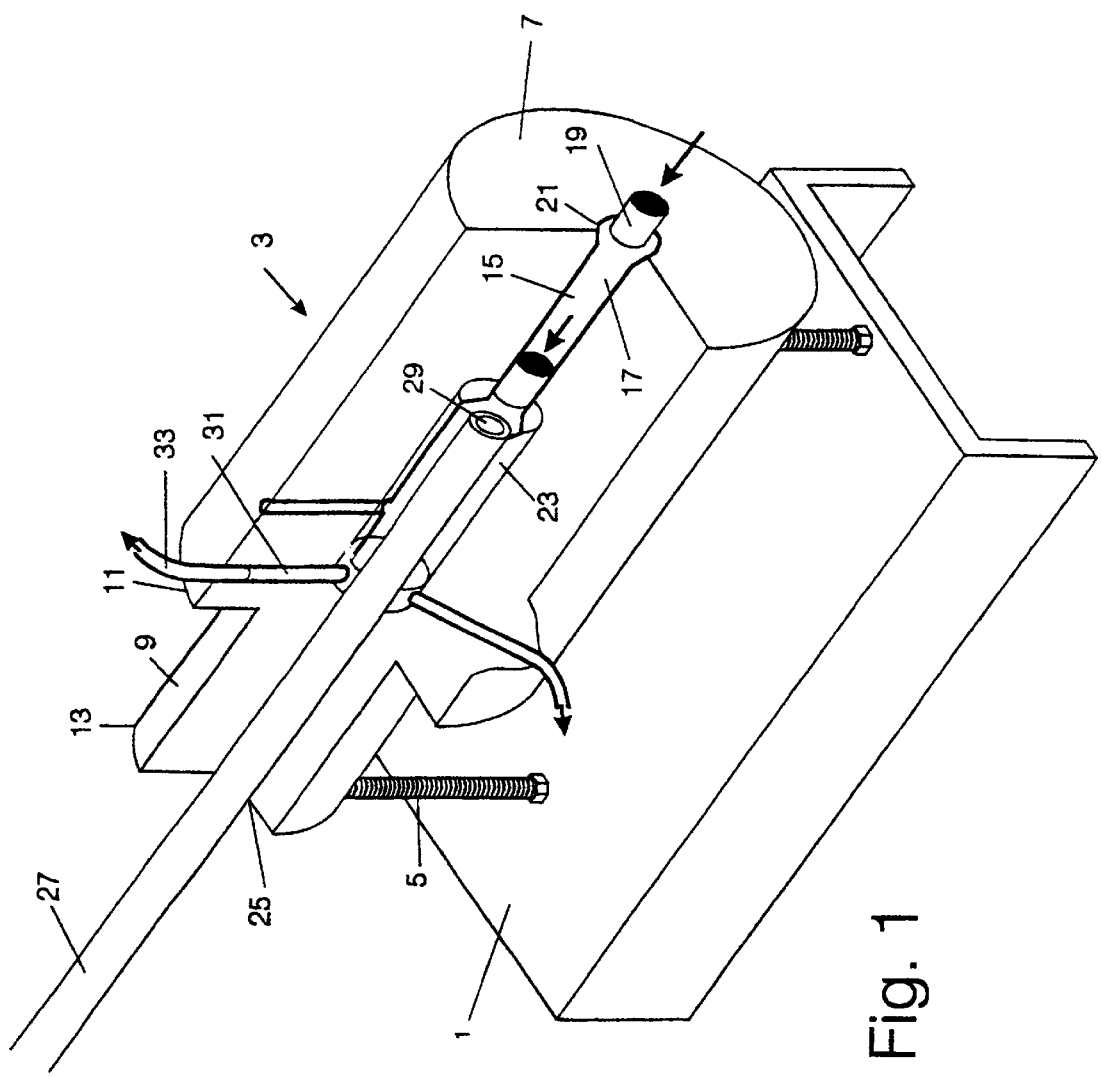

This invention relates to methods and apparatus for loading objects into tubes and is especially, but not exclusively, concerned with the loading of nuclear fuel pellets into fuel tubes or pins.

BACKGROUND TO THE INVENTION

Cylindrical oxide fuel pellets are pressed form granulated uranium dioxide powder. The pellets are sintered in a hydrogen atmosphere furnace to obtain the required density and are finely ground to obtain the correct diameter. The grinding operation is required in order to carefully control the clearance between the pellet and the tubular cladding, since this clearance determines the heat transfer characteristics of the fuel pin. During the grinding operation, however, a greasy residue of the order of 2 $\mu$m may become fixed to the surface of the fuel pellet.

A critical operation in the assembly of an oxide fuel pin is the process of inserting the finished fuel pellets into the fuel tube. The insertion problem is concerned with pellet jamming as a result of the formation of chips, debris and the like.

The total length of fuel pellets within a fuel pin may exceed 3 meters and, in some designs, 4 metres. It may be required to fill a fuel tube with the correct number of pellets within a short space of time, perhaps of the order of 30 seconds The fuel pellets may typically be manufactured in long and short lengths, nominally 13 mm and 10 mm. The use of both long and short pellets enables the correct pellet stack length to be made up for a particular fuel pin. Pellet jamming is likely to have a major impact upon the production of fuel pins since human access into the assembly areas is extremely difficult and the plant/equipment is normally operated remotely.

Uranium dioxide pellets are susceptible to capping, a term used to describe damage to the integrity of the pressing, and chips are easily detached. As the pellets are loaded into the tube, the tube is vibrated simultaneously in both the horizontal and vertical planes, in order to complete the transfer of the pellets once they are inside the tube. It frequently happens that the griding residue which has adhered to the pellet becomes transferred to an orifice through which the pellets pass prior to entry into the fuel tube. Over time this residue builds up and reduces the diameter of the orifice, eventually causing an obstruction which requires manual intervention to clear. A further problem associated with physical contact of the pellet and the loading equipment is encountered when chip debris becomes detached from a pellet during its passage through the orifice. The chip creates a wedge preventing the remaining pellets from being loaded.

In order to reduce or eliminate the above-mentioned problems, possible proposals which have been considered include the following:

1. Gravity loading the pellet into a vertically orientated fuel tube. Normally, height restrictions will preclude this possibility.

2. Positive air pressure to blow pellets into the tube. The use of compressed air will blow uranic contamination around the plant and, since the non-entry end of the tube is sealed, this approach is impractical.

3. Using two parallel wires to transport the pellets towards the tube. This method is in current use. The tension in the wire must be constantly checked to ensure the pellets are correctly supported. Otherwise they fall between the wires and must then be manually retrieved When the pellets arrive at the fuel tube they must be physically pushed into the open end.

4. Use of a robotic manipulator to "pick and place" the pellets. The large quantity of pellets which need to be transferred and the time taken for completion of such an operation make this approach impractical 5. Cushion Transfer. This method of transporting pellets using vibration and Floatex type carpet strips is in current use. However this process can release small numbers of fibres which must be prevented from becoming entrained within the fuel pellet stack. This method of trer is therefore not considered appropriate in the immediate vicinity of stack loading.

6. Removal of the end cap from the sealed end of the fuel tube and loading pellets into both ends. The resultant overall manufacturing changes would be relatively so significant hat this approach can not be contemplated In addition, it is necessary, at least for certain overall processes, to use fuel tubes sealed at one end. Removal of the end cap would involve unacceptable redesign.

STATEMENTS OF INVENTION

According to the present invention there is provided apparatus for successively loading solid objects into a tube via an open end thereof, the other end of said tube being closed, the apparatus comprising means for feeding said objects in a direction towards said open end of said tube, and means for producing a relatively reduced fluid pressure in a first region located between each said object and said open end, prior to the entry of an object into the tube, compared to that in a second region located on the side of said object emote from said open end of the said tube.

It has been surprisingly found that it is possible to load objects such as fuel pellets into tubes closed at one end by the use of a reduced pressure or vacuum which draws the pellet into the fuel tube. The means for producing a relatively reduced pressure are, in use, operated continually while the solid objects are being loaded into the tube.

Preferably, the tube is a nuclear fuel tube and the objects are substantially cylindrical fuel pellets.

Preferably th e feed means includes a housing having a cylindrical bore extending at least partly therethrough, said bore being axially aligned with said tube. More preferably, one end of said bore, remote from said tube, includes a tapered entrance section.

It is preferred that the other end of said bore terminates, in use, at a position spaced from the end of the tube. Preferably, the spacing between said other end of said bore and said open end of said tube is less than the length of said pellet i.e., between 1 and 5 mm. More preferably said spacing is about 3 mm.

Preferably the means for producing a relatively reduced fluid pressure include means for lowering the pressure in said first region relative to ambient pressure.

Preferably the above-mentioned bore extends from one end of said housing to a position within said housing where it opens into a chamber within which, in use, the open end of the tube is positioned. More preferably, means are provided for withdrawing fluid from the chamber. For instance, the chamber may be connected to an air line incorporating a venturi device which, in use, produces a reduced pressure within the chamber.

The present invention also provides a method for successively loading solid objects into a tub via an open end thereof, the other end of said tube being closed, the method comprising feeding the objects in a direction towards said open end, producing a relatively reduced fluid pressure in a first region located between each said object and said open end, prior to the entry of an object into the tube, compared to that in a second region located on that side of said object remote from said open end of said tube.

DESCRIPTION OF A PREFERRED EMBODIMENT

An embodiment of the present invention will now be described, by way of example only, and with reference to the accompanying drawing which is a diagrammatic illustration of apparatus for loading nuclear fuel pellets into a fuel tube.

Referring to the accompanying drawing, apparatus in accordance with the present invention include a stand 1 on which is located a fuel pellet insertion rig 3, the rig 3 standing on screw-threaded, adjustable, front and rear legs 5.

The main body of rig 3 includes a front body portion in the form of a perspex pellet guide 7 of cylindrical shape. Attached to the rear end of pellet guide 7 is a rear body portion in the form of an aluminium fuel tube guide 9. Tube guide 9 includes a forward section 11 of circular cylindrical form with a diameter which is the same as that of pellet guide 7. Extending rearwardly from section 11 is a cylindrical section 13 of relatively reduced diameter.

Pellet guide 7 has a central longitudinal hole 15 extending therethrough. In the forward part of guide 7, hole 15 is a relatively narrow bore 17 with a diameter just greater than that of the pellets 19 to be handled by the apparatus. Bore 17 includes a chamfered lead-in 21 at its front entrance.

About halfway along hole 15, bore 17 opens into a counterbored chamber 23 which provides the rearward section of hole 15.

Tube guide 9 also has a central, longitudinal hole or bore 25 extending therethrough. This bore 25 is of a diameter just sufficient to accommodate a fuel tube 27, as illustrated in the accompanying drawing. Bore 25 of tube guide 9 is axially aligned with hole 15 of pellet guide 7 so that a tube 27 may be fed through tube guide 9 and into chamber 23 of pellet guide 7, again as illustrated in the accompanying drawing. In use the tube 27 is inserted into the rig 3 until its open end 29 reaches a position which is spaced from but less than one pellet length from the position where chamber 23 connects with bore 15. This positioning of tube 27 within rig 3 is accomplished by means of the provision of a locking collar (not shown) on the outside diameter of tube 27, which locking collar abuts against the external rearward face of tube guide 9.

As indicated above, the bore 25 through tube guide 9 is a very close fit onto the outside diameter of a tube 27. This provides accurate concentric and axial location which also ensures a partial air seal.

The above-mentioned gap between the open end 29 of tube 27 and the rearward end of bore 17 should be less than the length of a fuel pellet. Typically the gap may be of the order of 3 mm.

The alignment of bore 17 with bore 25 is such that, if a pellet were located in bore 17, and there is no airflow within the apparatus, then the centre lines of the pellet 19 and the fuel tube 27 would be vertically offset by a distance of about 1.2 mm. It will be appreciated, therefore, that, unless there is some lifting or elevation of the pellets during their passage along the delivery tube when the rig 3 is in operation, the pellets will not enter the fuel tube 27. To provide air flow through the rig 3, three equi-spaced radially extending holes 31 extend from chamber 23 to the outside surface of pellet guide 7 close to the rearward end thereof. The holes are positioned so that they enter the chamber 23 at a minimum distance of 20 mm from the open end of fuel tube 27. Air lines 33 are engaged with holes 31 and, through appropriate interconnections (not shown), a common air line is connected into a venturi device (not shown). With process air in the air line at a pressure of 6 bar, air in the chamber 23 is withdrawn from rig 7 along air lines 33. As a result, an air flow is produced which travels along the delivery bore 17, into chamber 23 and exits along air lines 33 and through the venturi. When a pellet 19 is inserted into bore 17, it creates a pressure drop within the chamber 23 by reducing the flow area in bore 17. This pressure drop can be controlled by regulating the process air pressure prior to its entry into the venturi.

As a column of fuel pellets 19 is drawn towards the open end 29 of fuel tube 27, the pellets achieve a momentum sufficient to jump the gap and enter the fuel tube 27. The reduced air pressure at the open end 29 of the fuel tube 27 allows several of the pellets 19 to be automatically drawn into the bore 17. The remainder of the column is easily pushed in using a very low load. This load increases as the number of pellets within fuel tube 27 increases.

Although the fuel tube 27 has an end cap welded onto its opposite end, it has been surprisingly found that fuel pellets 19 will enter the open end of the fuel tube in the above described rig 3. It would seem that the air drawn into the chamber 23 diverges symmetrically around the end of the fuel tube 27, thus creating a pressure drop within that fuel tube. Pellets 19 are transported aerodynamically towards, and into, the open end of the fuel tube 27. If pellets were inserted into the fuel tube under normal atmospheric conditions, the pellets would push against a trapped column of air within the fuel tube. Since the opposition end of the tube is sealed, the air it contains would act as a pneumatic spring, resisting the entry of the pellets.

When a pellet 19 enters the fuel tube 27, normal air flow conditions would seem to be re-established, and the momentum of the pellet alone is sufficient to ensure that it enters the tube. Ambient air then refills the fuel tube.

Fine adjustment of the fuel pellet/fuel tube concentricity is achieved by the use of three grub screws in the perspex pellet guide 7.

What is claimed is:

1. An apparatus for successively loading solid objects into a tube having a closed end and an open end, said apparatus comprising:

a housing having a cylindrical bore extending at least partially therethrough, said bore having opposing first and second end portions, wherein said cylindrical bore is configured such that said first end portion is sized and configured with a first cross sectional width which extends a first axial length and defines a bore entry channel, and wherein said bore entry channel terminates into a chamber having a length and a second cross sectional width which is greater than that of said bore entry channel, said chamber being positioned such that it is proximate said second end portion of said cylindrical bore, said chamber having opposing forward and rearward portions;

a cylindrical tube having an open end and a closed end, said tube positioned in said chamber such that a portion of said tube axially extends a distance therein so that said open end is held in the forward portion of said chamber such that it is spaced apart from said bore entry channel to define an axially extending gap space therebetween and held in said chamber such that said tube is at least partially air sealed with a rearward portion of said chamber, wherein said gap space is sized such that it has a distance which is less than the length of the solid objects being loaded into said tube therethrough;

at least one fluid passage formed in said chamber such that it is disposed rearward of said tube open end and so that it outwardly extends through said housing;

wherein, in operation, solid objects are successively directed axially along said bore entry channel into said chamber across said gap space into said open end of said tube, and wherein, in operation, said chamber and a region of said tube proximate said open end are configured to exhibit a reduced fluid pressure.

2. An apparatus according to claim 1, wherein said at least one fluid passage are a plurality of radially extending circumferentially spaced apart passages.

3. An apparatus according to claim 1, wherein said cylindrical tube is a nuclear fuel tube which is sized and configured to receive substantially cylindrical fuel pellets, and wherein the objects which are successively loaded are cylindrical fuel pellets.

4. An apparatus according to claim 1, wherein said cylindrical bore is substantially axially aligned with said cylindrical tube.

5. An apparatus according to claim 1, wherein the reduced fluid pressure is a pressure which is lower than ambient pressure.

6. An apparatus according to claim 1, wherein said bore entry channel includes a tapered entrance section.

7. An apparatus according to claim 3, wherein said gap space has a length which is less than the length of the fuel pellets.

8. An apparatus according to claim 7, wherein said gap space has a length which is between about 1–5 mm.

9. An apparatus according to claim 7, wherein said gap space has a length which is about 3 mm.

10. An apparatus according to claim 2, wherein said fluid passages are configured to selectively direct air in and out of said chamber.

11. An apparatus according to claim 1, wherein said at least one fluid passage is configured to allow air to be withdrawn from said chamber.

12. An apparatus according to claim 2, wherein said fluid passages are formed in a rearward portion of said chamber such that they are rearward of said open end of said tube by a distance which is at least about 20 mm.

13. An apparatus according to claim 12, said apparatus further comprising a venturi device in fluid communication with said at least one fluid passage, and wherein, in operation, said venturi device and at least one fluid passage are configured to provide a reduced pressure in said chamber.

14. An apparatus according to claim 1, wherein said tube is held in said chamber such that it is axially offset from the axis of said bore entry channel.

15. An apparatus according to claim 3, wherein said tube extends across a major portion of the length of said chamber.

16. A method of successively loading solid objects into a tube having an open end and closed end, comprising:

feeding a plurality of solid objects successively into an open end of a bore entry channel;

directing the plurality of solid objects through the bore entry channel into a chamber having a cross-sectional width which is larger than the cross-sectional width of the bore entry channel;

causing the solid objects to jump axially across a gap space in the chamber to enter the open end of a tube;

reducing the pressure in the chamber, and successively loading the tube with the plurality of solid objects.

17. A method according to claim 16, wherein the cylindrical tube is a nuclear fuel tube which is sized and configured to receive substantially cylindrical fuel pellets, and wherein the objects which are successively loaded are cylindrical fuel pellets.

18. A method according to claim 17, wherein the gap space has a distance which is less than the length of the fuel pellets.

19. A method according to claim 17, wherein the gap space has a length which is between about 1–5 mm.

20. A method according to claim 19, wherein the gap space has a length which is about 3 mm.

21. A method according to claim 16, wherein the fluid passages are formed in a rearward portion of the chamber such that they are rearward of the open end of the tube by a distance which is at least about 20 mm.

22. A method according to claim 16, wherein the bore entry channel has an axis and the tube has an axis, and wherein, in position in the chamber, the tube is arranged such that its axis is offset from that of the bore entry channel.

23. A method according to claim 16, wherein the tube is arranged in the chamber such that it extends across a major portion of the length of the chamber.

* * * * *

UNITED STATES PATENT AND TRADEMARK OFFICE
CERTIFICATE OF CORRECTION

PATENT NO. : 6,327,320 B1
DATED : December 4, 2001
INVENTOR(S) : Hunter

It is certified that error appears in the above-identified patent and that said Letters Patent is hereby corrected as shown below:

<u>Title page,</u>
Item [86], should read as follows:
-- PCT No.:   PCT/GB98/01824 --.

Signed and Sealed this

Third Day of September, 2002

*Attest:*

*Attesting Officer*

JAMES E. ROGAN
*Director of the United States Patent and Trademark Office*